Jan. 8, 1952   J. CLARK   2,581,359
ELECTROMAGNETIC PRESSURE SENSITIVE DEVICE
Filed March 21, 1947
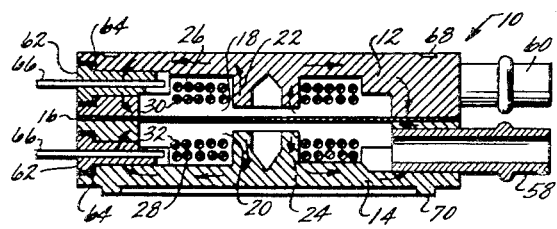
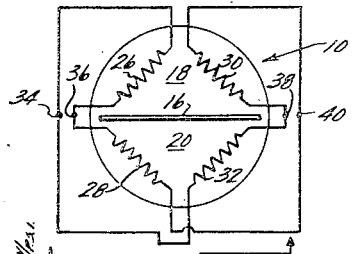
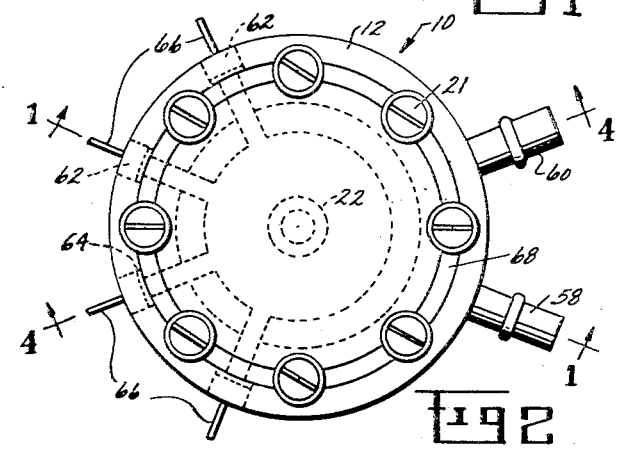
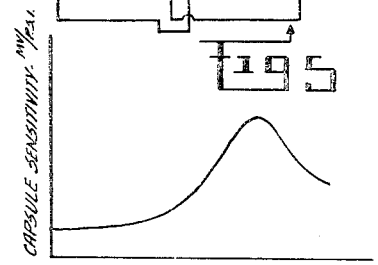
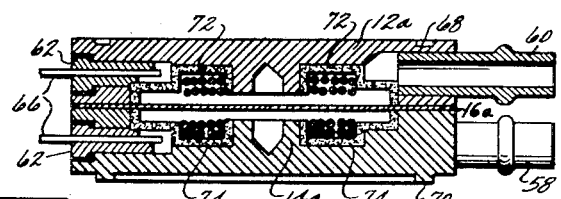
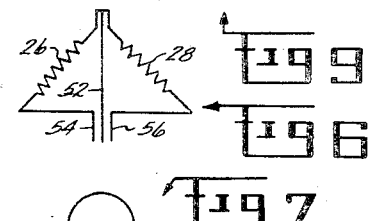
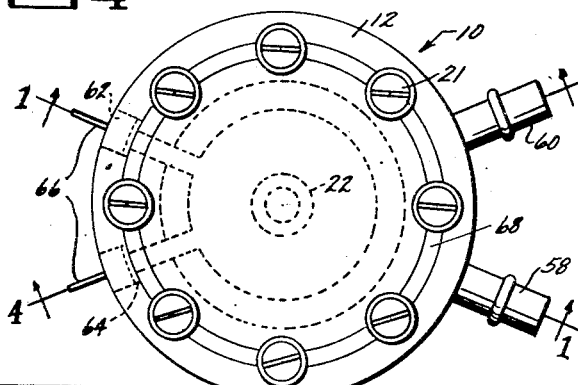
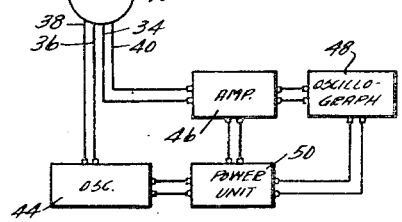
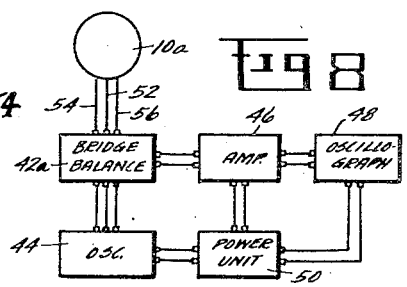
INVENTOR.
JAMES CLARK
BY Wade Koontz and
Frederick W. Cotterman
— HIS ATTORNEYS —

Patented Jan. 8, 1952

2,581,359

UNITED STATES PATENT OFFICE 2,581,359

ELECTROMAGNETIC PRESSURE SENSITIVE DEVICE

James Clark, Dayton, Ohio

Application March 21, 1947, Serial No. 736,183

3 Claims. (Cl. 171—242)

(Granted under the act of March 3, 1883, as amended April 30, 1928; 370 O. G. 757)

The invention described herein may be manufactured and used by or for the Government for governmental purposes without payment to me of any royalty thereon.

This invention is a continuation in part of my copending application Serial No. 605,175, filed July 14, 1945, now Patent No. 2,507,501 dated May 6, 1950, and relates to a pressure measuring system and more particularly to equipment for measuring pulsating and steady pressures by electronic means.

It has been proposed to measure pulsating pressures by using pressure responsive diaphragms connected to sensitive carbon pile resistances whose output was recorded by an oscillograph. It was found, however, that where there is any appreciable diaphragm movement, the carbon granules tend to separate from each other, thus giving poor contact which has a non-linear resistance characteristic, or they may pack together and refuse to follow the diaphragm pulsations. Moreover, upon repeated loading and unloading of the carbon granules which are in contact, the resulting abrasive action tends to pulverize them, whereby the clearance between the granules or carbon pile is continually raised.

The carbon pile devices above described are substantially an adaptation of the carbon button microphone which is used mainly where accurate response may be sacrificed for high output, as in throat microphones presently used by aircraft pilots.

It is also common practice in the art to connect pressure responsive diaphragms to velocity pickup units for picking up pulsating pressures, an example of this practice being the velocity microphone used in radio transmission, for which purpose the arrangement is highly desirable, since it operates upon a change in pressure. However, it will not operate on a constant pressure differential, and therefore cannot be used to pick up pressure differentials such as are encountered in aerodynamic and hydraulic flow. These pressure differentials are the difference between an unknown pulsating pressure and a known constant pressure, consisting of a steady or static pressure with a pulsating or dynamic pressure superimposed upon it. In order, therefore, to pick up these pressure differentials it is necessary for the pressure sensitive device to respond to the static pressure as well as the dynamic pressure.

It has also been proposed to use pressure responsive diaphragms as part of a variable condenser to pick up pressure pulsations. Such a variable capacity pickup however has the disadvantage that if it is used in a D.-C. bridge it will only pick up the dynamic pressure, but will not pick up any static pressure differences since it responds only to change in capacity. Moreover, if these capacity pickups are used in either a D.-C. bridge or an A.-C. bridge with an associate carrier system, it is necessary to have one stage of amplification adjacent to the pickup because of errors induced by the distributed capacitance of the leads to the condenser element, which results in a very large and bulky pickup which is impractical in aerodynamic and hydraulic application.

Where optical systems with mirrors cemented to the pressure responsive diaphragm have been tried, the response to the device is so small for the pressure differentials being measured, that an elaborate optical system is required. The result is that, in most applications, the vibration of the component parts in the optical system causes a greater error than the response of the optical system to the movement of the pressure responsive diaphragm.

A "sylphon" with mirrors attached has been substituted for the flat diaphragm, but while it provides a greater deflection the spring rate is so low that the resonant frequency is only from 10 to 20 cycles per second, which is entirely too low to measure the usual pulsating pressures encountered in aerodynamic and hydrodynamic flows. Moreover, the use of a "sylphon" in this situation is further limited because it expands and contracts with temperature changes which shifts the zero reference, whereby in wind tunnel and flight work the absolute value of the pressure differential is never certain since there is always a considerable temperature change with time in the wind tunnel and with altitude in flight work.

It is therefore an object of this invention to provide a device of the general character hereinbefore described but so constructed and arranged that it will accurately follow a pulsating pressure and will give a true value of the static and dynamic components of a pressure differential without shifting the zero reference in response to temperature changes.

Other objects and advantages will become evident as the invention is described in greater detail, reference being had to the drawings, wherein:

Fig. 1 is an axial section taken at 1—1 of Fig. 2 or Fig. 3 showing the interior construction of a pressure sensitive capsule made in accordance with my invention.

Figs. 2 and 3 are plan views of Fig. 1 as constructed for use with associate equipment shown in Figs. 7 and 8 respectively.

Fig. 4 is an axial section taken a 4—4 of Fig. 2 or Fig. 3 and shows a modification of the capsule shown in Fig .1.

Figs. 5 and 6 show diagramamticaly how the leads of Figs. 2 and 3 are connected when the capsule is to be used with the associated equipment of Figs. 7 and 8 respectively.

Figs. 7 and 8 show how capsules shown in either Fig. 1 or Fig. 4 are electrically connected to associated equipment.

Fig. 9 is response curve of the pressure capsules shown in Figs. 1 through 4.

Like reference characters refer to like parts throughout the several views.

The direction of stress and consequently strain in any circular diaphragm clamped at the edge and uniformly loaded follows radial lines from the center of the diaphragm outward and becomes a maximum at a position adjacent the clamped edge. The equation for strain at the clamped edge of the diaphragm is:

$$\theta = \frac{3qr^2}{4h^2E}$$

wherein $\theta$ = unit strain,
$q$ = distributed load/unit area,
$r$ = radius of free diaphragm,
$h$ = thickness of diaphragm,
$E$ = modulus of elasticity.

In order to design the most effective type of pickup unit for any purpose it is necessary to know the deflection at the center of the diaphragm for various loads. This may be expressed by the equation:

$$\delta = \frac{qr^4(1-\mu^2)}{5.33Eh^3},$$

wherein $\delta$ = deflection at center of diaphragm,
$q$ = pressure per unit area of diaphragm,
$r$ = radius of free diaphragm,
$\mu$ = Poisson's ratio.

Figs. 1, 2 and 3 show an improved pressure sensitive capsule 10 which operates on the reluctance principle. The magnetic elements of the reluctance unit form the housing of the capsule, the housing being made in two parts 12 and 14 with a diaphragm 16 between them, thereby separating the space within the housing into two chambers 18 and 20, the whole being clamped together by screws 21 to effect pressure tight joints between the several parts.

In addition to forming the housing of the capsule, the parts 12 and 14 serve as the magnetic elements of the device, having poles 22 and 24 which are encircled by four coils 26, 28, 30 and 32, the eight ends of which are brought through the wall of the housing so that coil ends in chamber 18 on one side of the diaphragm 16 may be connected to coil ends in chamber 20 on the other side of the diaphragm 16, as seen in the diagram Fig. 5. When so connected the four coils form the four arms of an A.-C. bridge, the four leads 34, 36, 38 and 40 being provided for connecting the capsule to its associated equipment shown in Fig. 7, wherein leads 36 and 38 are connected to an oscillator 44 and leads 34 and 40 to an amplifier 46, the output of the amplifier 46 being fed into an oscillograph 48, all being powered by a source of electric current supply 50.

By omitting coils 30 and 32 from the capsule 10, the four ends of the remaining coils 26 and 28 form two arms of an A.-C. bridge and may be connected as seen in Fig. 6, where one end of each coil is connected to a common lead 52, and leads 54 and 56 are connected to the other ends of the coils 26 and 28 respectively, the three leads being brought out through the housing for connection to the associate equipment shown in Fig. 8, where the three leads are taken to a bridge balance which contains the other two arms of the A.-C. bridge. The hookup Fig. 8 differs from Fig. 7 only in that, in Fig. 8, the unit 42a contains two arms of the A.-C. bridge and a means to balance the bridge. The pressure sensitive device may also be used in a bridge or potentiometer circuit in connection with a D.-C. amplifier, all of which are well known in the art, to indicate or record pulstating pressure.

The joints between the housing portions 12 and 14 and the diaphragm 16 should be very carefully fitted for the reason that these joints must not only insure against leakage of the reference pressure and the pressure which is to be measured, but must add a minimum of reluctance to the magnetic circuits. Pressure tube connections 58 and 60 are separately made and inserted and pressure sealed, one in the housing portion 12 for communication with pressure chamber 18, the other being both axially and circumferentially spaced in housing portion 14 for communication with pressure chamber 20. Either of the pressure tube connections 58 or 60 may be used to admit a reference pressure, the other being then connected to a source of pulsating or static pressure which is to be measured.

When the capsule 10 contains four coils as seen in Figs. 1, 2 and 5, four circumferentially spaced apart insulating bushings 62 extend radially into the chamber 18, and four more into the chamber 20, for bringing out the coil ends which are joined outside the housing as seen in Fig. 5. In cases where the two coils 30 and 32 are omitted and connection is made as in Fig. 6, only half as many leads 66 are required (see Fig. 3). Sealing washers 64 of Neoprene or the like are placed under the heads of the bushings 62, the bushings being coated with a sealing compound before they are pressed into place.

Electrically conductive terminal pins 66 are coated with a sealing cement and pressed into the bushings, the ends of the pins where they emerge from the bushings being further treated with the sealing cement. Pairs of coil ends may then be connected within the capsule each pair to its pair of pins.

The magnetic circuit in housing parts 12 and 14 is energized by the circular coils 26—30 and 32—28 respectively. The path of the flux in the two magnetic circuits is shown by the arrows in Fig. 1. As shown, the coils 26—30 and 32—28 each generate a magnetic field which flows through housing parts 12 and 14 respectively and joins at the outer edge of the diaphragm. The flux of these two magnetic fields adds together in the diaphragm as it flows radially inward toward the center pole pieces 22 and 24. When the flux reaches the center of the diaphragm it separates, part entering each pole piece, and continues its path as before. The amount of flux entering a given pole piece is determined by the air gap between the diaphragm and that pole piece. When the air gap between the diaphragm and one pole piece increases and correspondingly decreases the flux flowing therethrough, the air gap between the diaphragm and the other pole piece necessarily decreases and correspondingly increases the flux in said other pole piece. It follows that variations in the pressure acting upon one side of the diaphragm, against a uniform reference pressure which is acting upon the other side of the diaphragm, will create movement of the diaphragm, which increases the flux in one magnetic circuit and decreases the flux in the other, thereby changing the inductive reactance of the coils which are arms of the A.-C. bridge. This change in reactance is reflected in the electric circuit of the bridge as a change in A.-C. resistance of the bridge arms contained in the capsule. This change in resistance of the bridge arms causes an unbalance of the bridge, thereby causing a change in amplitude of the carrier which is furnished by the oscillator. This modulated carrier is amplified and demodulated by amplifier 46 and recorded by recording oscillograph 48 as shown in Fig. 7.

The maximum sensitivity of the capsule and the frequency of the carrier at which it occurs may be determined by controlling the eddy current losses in the magnetic circuit comprised of pole pieces 20 and 22 and housing parts 12 and 14 respectively and the diaphragm 16, by the proper selection of material and dimensions of the various component parts, and by the size of wire, number of turns in each coil, and the current through each coil 26, 28, 30 and 32.

The change in sensitivity with change in frequency of the carrier furnished by oscillator 44 is shown in Fig. 9 where the capsule sensitivity is plotted against frequency of the carrier. This diagram shows the carrier frequency at which maximum sensitivity is attained. This frequency may be varied by the changes hereinbefore enumerated.

Housing portion 12 is provided with an annular groove 68, and housing portion 14 with a mating annular rib 70, so that a number of pressure capsules will be in axial alignment when stacked one on the other. The pitch diameter of the annular groove 68 coincides with the bolt circle of the screws 21, so that any force exerted in clamping together a stack of these capsules will not disturb the clamping of the diaphragm. The height of the annular rib 70 is greater than the depth of the annular groove 68 so that when a stack of the capsules is clamped together, the adjacent housing parts 12 and 14 only touch each other at the aligning annuli, and thus eliminate any deflection of the housings of the several clamped-together capsules, whereby there will be no change in the air gap between the several diaphragms and pole pieces due to clamping.

The reason for locating both the electrical terminals and the tube connections on the circumference of the housing instead of on the ends, is so that a number of the capsules may be stacked, one upon the other as hereinbefore described.

One of the serious difficulties encountered in the design of pressure sensitive devices of the character herein shown is that the zero reference changes with changes in temperature of the device. By using "Invar" steel or other alloys having a very low thermal coefficient of expansion for the housing parts and the diaphragm substantially all errors due to temperature variation are eliminated in the pressure sensitive capsules herein shown. Similarly, by winding the coils with "Copel" wire, which has a very low temperature coefficient of resistivity, the change in resistance with temperature change in the two coils of a unit is practically eliminated. The magnetic circuits may be made identical electrically by carefully annealing the housing parts after machining and then selecting matched sets. Where the electric and magnetic structure on one side of the diaphragm is exactly like that on the other side of the diaphragm, and a minute structural change of the parts due to a slight temperature rise occurs, one side will cancel out the other, and the zero reference will remain constant.

If desired, the sensitivity of the reluctance type of capsule herein shown may be decreased by connecting the input leads of either coil in reverse to the other coil, whereby the current in one coil will flow in the opposite direction to that of the other coil. When so connected, the flux in one magnetic circuit will flow radially outward, one circuit bucking the other out completely when the diaphragm is in its center position but leaving a relatively small residual flux whenever the diaphragm is deflected in either direction from its neutral position.

For most work, where the ultimate in sensitivity of the pressure capsule is not required, or where the use of a high frequency carrier is desired, and where a minute drift in the zero reference may be tolerated, the capsules may be made as shown in Fig. 4. Housing parts 12a and 14a serve only as the outer inclosure and may therefore be made of "Dural" or some similar light weight nonmagnetic material or of plastic. The parts of the magnetic circuit 72 and 74 contained in the housing may be made of powdered iron or some magnetic material cemented or otherwise fastened to the inside of the housing as shown in Fig. 4, or the entire capsule may be made as shown in Fig. 1 but with the housing made of powdered iron and the pores thereof sealed pressure tight with some plastic cement or similar sealing compound.

The reluctance type pressure sensitive capsule shown in Figs. 1 and 2 is more efficient than similar devices heretofore proposed since the entire capsule body carries magnetic flux, the two parts of the body acting as a protective covering as well as the pole pieces. Each of the magnetic circuits is close-coupled, the entire path being through a magnetic material except at the air gap at the pole pieces where the deflection of the diaphragm is to be measured. Another advantage of this close-coupling is that the proximity of another magnetic body or field will not disturb the flux distribution in the two magnetic circuits.

It is noted that while the structure shown in Figs. 1 through 4 may be the preferred form the device is still operative, though it may be somewhat less effective, when only one of the cup-shaped housing parts 12 or 14 are used and the diaphragm is welded or similarly secured to the rim of the cup, thereby enclosing one only of the chambers 18 or 20 with its winding 26, 30 or 28, 32. The remaining pressure connection either 58 or 60 may then bring in the pressure to be measured, and the outside of the diaphragm exposed to the ambient air or vice versa. Subcombination claims are accordingly presented to this operative portion of Figs. 1 through 4.

Having described an embodiment of my invention,

I claim:

1. A pressure sensitive electromagnetic device comprising a hollow shell of magnetic material, a flexible flux conducting diaphragm secured throughout its peripheral portions to said shell and separating the hollow of said shell into two similar pressure-tight chambers, the central portion of the diaphragm having a small spacing from adjacent portions of the shell to provide a single air gap at each side of the diaphragm, a pair of windings at each side of said diaphragm arranged coaxially with said diaphragm adapted for connection in a bridge circuit, means to subject the diaphragm at opposite sides thereof to different pressures to cause it to flex and inversely vary the lengths of said air gaps to inversely vary the reluctance of the magnetic circuits at opposite sides of the diaphragm, and means for insulatedly bringing the terminals of said windings through the shell to the outside thereof.

2. A pressure sensitive electromagnetic device comprising in combination, a pair of disc-like elements of magnetic material, each having an annular recess forming a peripheral side wall and a central pole piece, a disc-like flexible flux-conducting diaphragm, means securing the peripheral portion of the diaphragm between the peripheral side walls of said elements, with a normal small spacing from the ends of said pole pieces, said diaphragm forming a common part of two magnetic circuits one through each of said elements, windings on said pole pieces adapted for connection in a bridge circuit, means for insulatedly bringing the terminals of said windings through said elements to the outside thereof, and means for applying a force to cause the diaphragm to flex and inversely vary the reluctances of the two magnetic circuits with inverse effect on electrical characteristics of the windings on the pole pieces.

3. An electromagnetic device of the class described, comprising a pair of opposed recessed housing elements of magnetic material, a flexible flux-conducting diaphragm, means holding the peripheral portions of said diaphragm between said elements so that the diaphragm forms an integral part of two magnetic circuits each including one of said elements, a central pole piece in the recess of each of said elements and extending between a wall of the element and the diaphragm except for a single air gap, said elements providing radial flux-conducting paths from the pole pieces to the peripheral portions of the diaphragm, and windings adapted for connection in a bridge circuit and arranged in the recesses of said elements around said pole pieces and having characteristics that are varied by inverse changes in the reluctances of the two magnetic circuits due to flexing of said diaphragm by a force applied thereto.

JAMES CLARK.

REFERENCES CITED

The following references are of record in the file of this patent:

UNITED STATES PATENTS

| Number | Name | Date |
|---|---|---|
| 1,560,951 | Thompson et al. | Nov. 10, 1925 |
| 1,718,494 | Schurig | June 25, 1929 |
| 2,178,471 | DeBruin | Oct. 31, 1939 |
| 2,376,156 | Kuehni | May 15, 1945 |
| 2,440,605 | Hathaway | Apr. 27, 1948 |
| 2,445,455 | Rights et al. | July 20, 1948 |
| 2,448,322 | Piety | Aug. 31, 1948 |